Oct. 6, 1953 H. P. BOSWAU ET AL 2,654,811

TELEPHONE SET

Original Filed July 20, 1944 2 Sheets-Sheet 1

Inventors.
Alexander C. Reid, &
Hans P. Boswau.
By [signature] Atty.

Inventors.
Alexander C. Reid, &
Hans P. Boswau.
By [signature] Atty.

Patented Oct. 6, 1953

2,654,811

UNITED STATES PATENT OFFICE 2,654,811

TELEPHONE SET

Hans P. Boswau, Dundee, and Alexander C. Reid, Genoa, Ill., assignors to Leich Electric Company, Genoa, Ill., a corporation of Illinois Original application July 20, 1944, Serial No. 545,760. Divided and this application July 27, 1949, Serial No. 107,036

8 Claims. (Cl. 179—146)

This application is a division of application Ser. No. 545,760, filed July 20, 1944, now Patent No. 2,492,375, issued December 27, 1949.

The invention is concerned with telephone sets, and its particular object is to provide a telephone set having a new cradle structure comprising pivotally mounted adapter means, as a normal and substantially permanent part thereof, which adapts the telephone set for instant selective use either upon a horizontal surface such as formed by a desk or upon a vertical surface such as formed by a wall.

This object is realized in one form of the invention by the provision of a cradle structure comprising an integral angular platelike member having a pivotally mounted arm or portion which is disposed above the switch plungers in parallel with the base and an arm or portion which extends perpendicular thereto, and in another form of the invention by the provision of a cradle structure comprising a platelike adapter member which may be positioned between the switch plungers in parallel with the base or perpendicular to the base, thus furnishing in either case two permanently available cradle seats for a hand telephone, one for desk use and the other for wall use.

Another object of the invention is to provide a cradle structure comprising a movably mounted integral member forming two permanently available cradle seats, one for desk use and one for wall use of the corresponding telephone set, and means formed by said member as a part of one of said cradle seats for actuating the switch hook plungers in either form of use of the telephone set.

A further object is to provide a cradle structure having a depression or recess between the usual pairs of tines at either end of the cradle portion of the cover of a telephone set, which form part of a first cradle seat, and a platelike member pivotally disposed in said depression for forming a second cradle seat extending perpendicular to the plane of the first seat.

The above intimated objects and other objects and features will appear from the description of the invention which is rendered below with reference to the accompanying drawings. In these drawings, Fig. 1 is a diagrammatic elevational side view of an embodiment of a telephone set made in accordance with the invention, as seen when used as a desk set, with some parts of the cradle structure in section to indicate details;

Like parts are numbered alike throughout the drawings. Known elements and details will be described only to the extent required for conveying an understanding of the invention.

Figure 1:
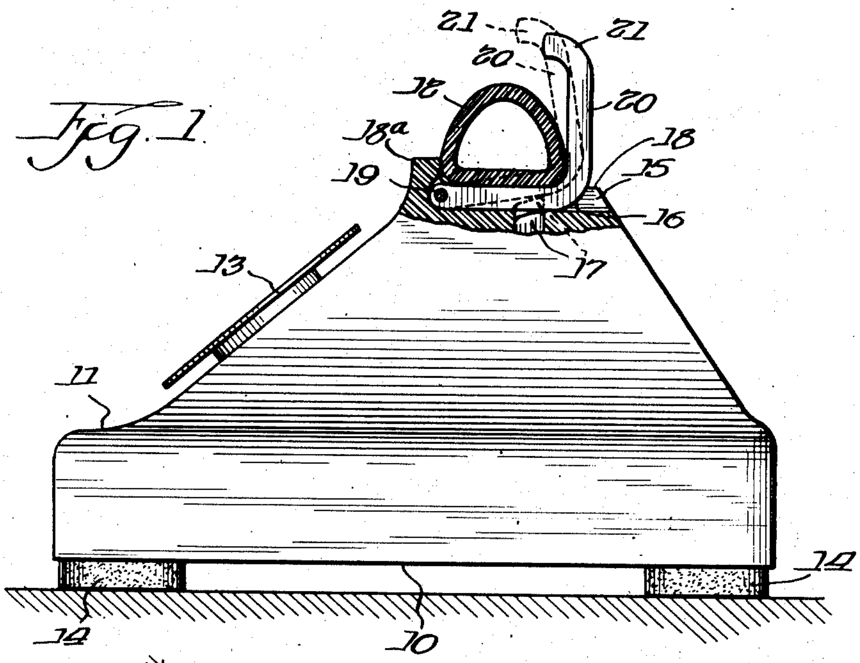
Figure 2:
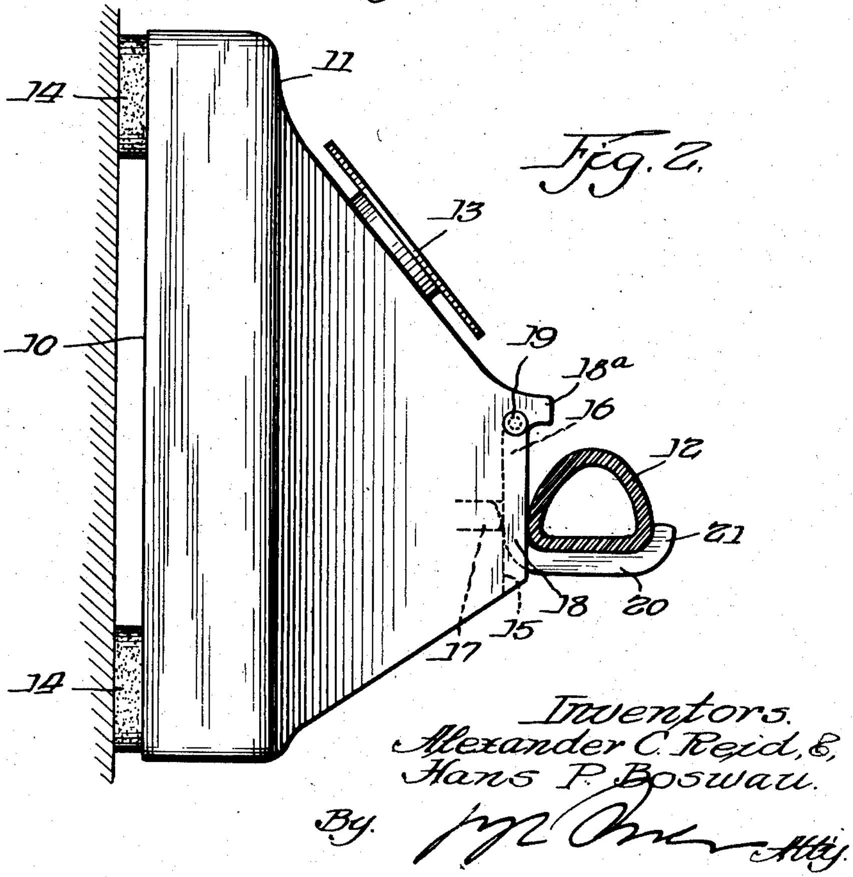
Fig. 2 illustrates the telephone set of Fig. 1 when mounted on a wall.

The embodiment of the telephone set shown in Figs. 1 and 2 comprises a base 10 and a cover 11 forming a support for a hand telephone shown diagrammatically in section at 12. Details of the telephone set, as well as of the hand telephone per se, including the usual ringing and switching equipment and the wiring therefor, form no part of the invention have therefore been omitted. A dial may be furnished as a part of the telephone set, as indicated at 13.

The base 10 is provided with resilient feet 14 for placing the set either upon a horizontal surface which may be formed by a desk, as indicated in Fig. 1, or for mounting it on a wall, as indicated in Fig. 2. In the latter case the mounting may be accomplished in any desired and suitable manner.

In the cradle portion of the cover 11 is formed a recess 15 for accommodating the arm 16 of an angular adapter integral plate member which extends within the recess 15 above the switch hook plungers 17 laterally across the plane of the cradle (perpendicular to the plane of the structure as shown in Figs. 1 and 2) between the end portions 18 which carry the tines 18*a*. The arm 16 is pivotally secured to the cradle portion of the cover 11 within the recess 15 by a hinge pin 19. The arm 16 of the adapter plate member thus forms a first cradle seat for use when the telephone set is employed as a desk set. The tines 18*a* projecting from the cradle portion of the cover 11 define the limits of the first cradle seat in forward direction, one such tine of course being provided at each end 18 of the cradle.

The second cradle seat, for use when the telephone set is mounted on a wall, as indicated in Fig. 2, is formed by the platelike arm or portion 20 of the adapter member, which is disposed perpendicular to the arm 16 and integral therewith. The lip 21 functions in the nature of tines to define the limits of the second cradle seat in forward direction and to hold the hand telephone against accidental displacement. Tines may of course take the place of the lip 21 and, if desired, relatively long projections, one at either end of the arm or portion 16, and each provided with a lip such as 21 may take the place of the platelike arm 20.

When the telephone set is used on a desk, with the hand telephone 12 resting on the hinged plate portion 16 of the adapter member, the weight of the hand set is directly over the switch plungers 17, depressing the plungers. The platelike portion 16 of the adapter member thus functions as a first cradle seat which is effective when the telephone set is positioned on a horizontal surface and also functions as a means for actuating the switch plungers. Removal of the hand set causes the plungers 17 to move upwardly from the full-line depressed position into the dotted-line position, thus angularly displacing the adapter member counter-clockwise into its dotted-line position shown in Fig. 1.

When the device is mounted on a wall in the position shown in Fig. 2, with the hand telephone resting on the second cradle seat formed by the arm or portion 20, which is integral with the platelike arm 16, the weight of the hand set 12 tends to rotate the angular adapter member clockwise, thus holding the plungers 17 in depressed position. The arm 16 of the adapter member, which forms the first cradle seat, is thus also effective to actuate the switch plungers when the set is positioned on a vertical surface. Removal of the hand set causes operation of the plungers, as in the previous case, thus again displacing the adapter member counterclockwise into the dotted-line position, as shown in Fig. 1.

The only changes required to convert the telephone set from a desk to a wall set involve fastening the base 10 to a wall and, if a dial 13 is used, turning such dial around so that its symbols and numerals are in correct upright position.

Figure 3:
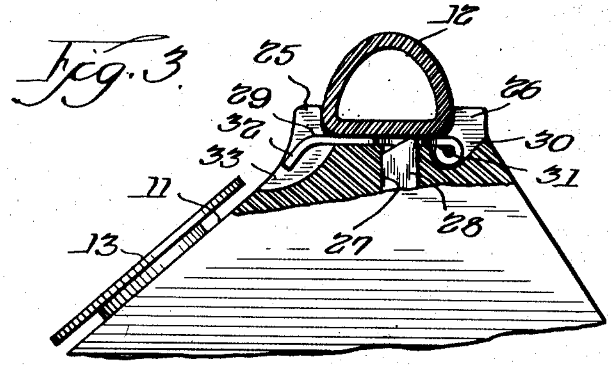
Fig. 3 is a fragmentary sectional view illustrating a modified cradle structure as it appears when the corresponding telephone set is used as a desk set.
Figures 4, 5:
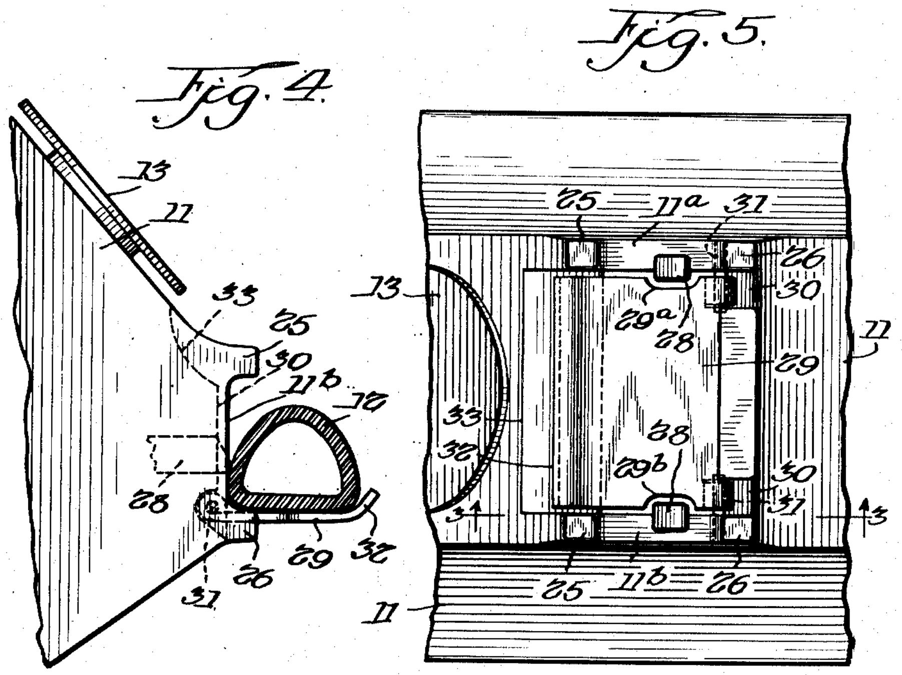
Fig. 4 is a view in side elevation showing the parts of the cradle structure of Fig. 3 in the position occupied when the corresponding set is mounted on a wall.
Fig. 5 illustrates a diagrammatic plane view of the cradle structure shown in Fig. 3.

The modified cradle structure illustrated in Figs. 3–5 provides for a support or cover 11, having the usual pairs of tines 25—26 forming part of a first cradle seat, and also providing apertures such as 27, for the usual switch hook plungers 28. A platelike adapter member 29 is disposed in a depression or recess 30 extending between the elevated portions 11*a* and 11*b* at either end of the cradle, and is hinged at 31. Notches 29*a* and 29*b* are formed in the opposite edges of the platelike member 29 to provide clearance for the corresponding sides of the switch hook plungers 28. The plate 29 forms a lip 32 which is disposed at an angle to the plane of its body portion and extends in the position shown in Figs. 3 and 5 into a recess 33 formed in the cover 11.

The platelike adapter member 29 thus forms part of the first cradle seat for the hand telephone 12, as shown in Fig. 3, when the corresponding telephone set is used as a desk set. The plungers 28 are operated in obvious manner directly by the hand telephone.

The platelike member 29 is rotated into the position shown in Fig. 4 to provide a second cradle seat for receiving the hand telephone 12 when the telephone set is mounted on a wall. The switch hook plungers are in this form of use of the telephone set again operated directly by the hand telephone in a manner which will be presently described more in detail.

The changes required to convert the telephone set from desk to wall use thus involve, as in the previous case, mounting of the set on a wall, turning around the dial, if such is used, to position its symbols and numerals properly and, in addition, swinging the platelike member into the position shown in Fig. 4 to provide the second cradle seat for wall use.

It will be observed that the axes of the switch hook plungers 28 are disposed off-center transversely of the first cradle seat, and that their free ends are bevelled, with the axially longest portion of each plunger adjacent and relatively close to the plane of the adapter plate 29 and parallel therewith when the adapter plate is in the position to form the second cradle seat, as shown in Fig. 4. This is done to assure operation of the plungers by the hand set 12 when the hand telephone is replaced on the second cradle seat. The hand set engages the tips of the bevelled ends of the plungers at its widest portion, in a wedging action, urging them inwardly as it moves into its resting position on the adapter plate 29. The outward pressure of the plungers against the hand set 12, in the resting position shown in Fig. 4, acts to press the hand set downwardly on its seat and laterally against the lip 32, securing it in position.

Changes may be made within the scope and spirit of the accompanying claims in which is defined what is considered new and desired to have protected by Letters Patent of the United States.

We claim:

1. A telephone set for instant selective use as a set mounted on a horizontal surface such as formed by a desk or for use as a set mounted on a vertical surface such as formed by a wall, said set having a cover which comprises a cradle portion for supporting the handle element of a hand telephone and having switch plungers movably disposed in said cradle portion and tine means extending from said cradle portion at each end thereof, an adapter member disposed on said cradle portion, said adapter member comprising a platelike portion extending along the space between said tine means to form a first seat for the handle element of said hand telephone which extends underneath such handle element thereof when said set is mounted on a horizontal surface, an integral extension projecting from said plate-like portion at an angle thereto to form part of a second seat for the handle element of said hand telephone when said set is mounted on a vertical surface, and means for pivotally securing said adapter member on said cradle portion as a substantially permanent fixture thereof to make said first and said second seats effective for cooperation with said hand telephone in the two respective mounting positions of said set.

2. The structure defined in claim 1, wherein said switch plungers are operatively actuated responsive to displacement of said hand telephone relative to either of said cradle seats directly by said platelike portion of said adapter member forming said first seat which extends underneath the handle element of said hand telephone when said set is mounted on a horizontal surface.

3. The structure defined in claim 1, wherein said integral extension projecting from said platelike portion of said adapter member comprises a similar platelike portion which forms said second seat for the handle element of said hand telephone when said set is mounted on a vertical surface, and a lip formed at the free end of said similar platelike portion to define the outer end of said second seat.

4. The structure defined in claim 1, wherein said integral extension projecting from said platelike portion of said adapter member comprises a similar platelike portion which extends perpendicular thereto and forms said second seat for the handle element of said hand telephone when said set is mounted on a vertical surface, and a lip formed at the free end of said similar platelike portion to define the outer end of said second seat.

5. The structure defined in claim 1, wherein said platelike portion of said adapter member extends in a plane along said cradle portion underneath the handle element of said hand telephone in the space between said switch plungers and in parallel with the plane of said cradle portion when said set is mounted on a horizontal surface.

6. The structure defined in claim 1, wherein said platelike portion of said adapter member extends in a plane along said cradle portion underneath the handle element of said hand telephone in the space between said switch plungers and in parallel with the plane of said cradle portion when said set is mounted on a horizontal surface and wherein such platelike portion extends in a plane perpendicular to the plane of said cradle portion when said set is mounted on a vertical surface.

7. The structure defined in claim 1, wherein said switch plungers are operatively actuated responsive to displacement of said hand telephone relative to either of said cradle seats directly by the handle element of said hand telephone.

8. The structure defined in claim 1, wherein said switch plungers are disposed off-center transversely of said cradle portion for operative actuation thereof responsive to displacement of said hand telephone relative to either of said cradle seats directly by the handle element of said hand telephone.

HANS P. BOSWAU.
ALEXANDER C. REID.

References Cited in the file of this patent

UNITED STATES PATENTS

| Number | Name | Date |
|---|---|---|
| 2,277,280 | Vaugh | Mar. 24, 1942 |
| 2,277,296 | Burfeind | Mar. 24, 1942 |

FOREIGN PATENTS

| Number | Country | Date |
|---|---|---|
| 66,494 | Norway | Dec. 6, 1943 |